(12) United States Patent
Völker et al.

(10) Patent No.: US 11,885,406 B2
(45) Date of Patent: Jan. 30, 2024

(54) TRANSMISSION HAVING A FAN ASSEMBLY

(71) Applicant: SEW-EURODRIVE GMBH & CO. KG, Bruchsal (DE)

(72) Inventors: Konstantin Völker, Bruchsal (DE); Jan Knittel, Dettenheim (DE); Claus Kunik, Waghäusel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/911,268

(22) PCT Filed: Feb. 25, 2021

(86) PCT No.: PCT/EP2021/054737
§ 371 (c)(1),
(2) Date: Sep. 13, 2022

(87) PCT Pub. No.: WO2021/180484
PCT Pub. Date: Sep. 16, 2021

(65) Prior Publication Data
US 2023/0102652 A1 Mar. 30, 2023

(30) Foreign Application Priority Data
Mar. 13, 2020 (DE) .......................... 102020001683.9

(51) Int. Cl.
*F16H 57/04* (2010.01)

(52) U.S. Cl.
CPC ................................ *F16H 57/0416* (2013.01)

(58) Field of Classification Search
CPC ............................ F16H 57/0416; H02K 9/06
See application file for complete search history.

(56) References Cited

U.S. PATENT DOCUMENTS 2,325,913 A * 8/1943 McLemore, Jr. ..... F04D 29/703
416/247 R
4,872,502 A * 10/1989 Holzman ............ F16H 57/0415
165/47

(Continued)

FOREIGN PATENT DOCUMENTS

CN 203394862 U 1/2014
CN 113803445 A * 12/2021 ......... F16H 57/0416

(Continued)

OTHER PUBLICATIONS

Machine translation of JP 2019173897 A, obtained from Espacenet. (Year: 2019).*

(Continued)

*Primary Examiner* — Thomas C Diaz
(74) *Attorney, Agent, or Firm* — CARTER, DELUCA & FARRELL LLP (57) ABSTRACT

A transmission includes a fan assembly, including a fan wheel, a hood, and a guard. The fan wheel is connected to the driving shaft of the transmission for conjoint rotation, and the hood is attached to a, e.g., multi-piece retaining frame fastened to the housing of the transmission. The guard is formed of two guard parts, and the first parting line thereof is a straight segment or formed of two straight segments in alignment with each other. The hood is formed from two hood parts, and the second parting line thereof is a flat curve including straight line segments.

28 Claims, 6 Drawing Sheets

(56) References Cited

U.S. PATENT DOCUMENTS

| | | | | |
|---|---|---|---|---|
| 6,045,330 | A * | 4/2000 | Williams | F04D 29/703 |
| | | | | 415/121.2 |
| 9,366,332 | B2 * | 6/2016 | Hayashi | F16H 57/0416 |
| 9,599,406 | B2 * | 3/2017 | Tietyen | F28D 1/0383 |
| 9,756,759 | B2 | 9/2017 | Kimura | |
| 10,581,301 | B2 | 3/2020 | Verardi et al. | |
| 11,536,362 | B2 * | 12/2022 | Kunik | F16H 57/0416 |
| 2011/0179903 | A1 * | 7/2011 | Tietyen | F28D 1/0383 |
| | | | | 74/606 A |
| 2014/0338495 | A1 | 11/2014 | Hayashi | |
| 2018/0262094 | A1 * | 9/2018 | Blankemeier | H02K 49/106 |

FOREIGN PATENT DOCUMENTS

| | | | | |
|---|---|---|---|---|
| DE | 102005031197 | A1 * | 1/2007 | F04D 29/329 |
| DE | 102005031197 | A1 | 1/2007 | |
| DE | 102007009366 | A1 | 8/2008 | |
| DE | 102008010912 | A1 * | 8/2008 | F04D 29/281 |
| DE | 102008010912 | A1 | 8/2008 | |
| DE | 102008017755 | A1 | 10/2009 | |
| DE | 112014000834 | T5 | 11/2015 | |
| DE | 112013007680 | T5 | 10/2016 | |
| GB | 436416 | A | 10/1935 | |
| JP | 2019173897 | A * | 10/2019 | F16H 57/0416 |

OTHER PUBLICATIONS

International Report on Patentability issued in corresponding International Application No. PCT/EP2021/054737 dated Sep. 6, 2022, pp. 1-7, English Translation.

International Search Report issued in corresponding International Application No. PCT/EP2021/054737 dated Apr. 16, 2021, pp. 1-2, English Translation.

SEW-EURODRIVE GmbH & Co. KG, "New generation of the preserved Industrlegetrlebe series X—Generation X.e" Bauma Exhibit Halle A3.213 (Sep. 20, 2019) pp. 1-3, together with English-language translation.

* cited by examiner

TRANSMISSION HAVING A FAN ASSEMBLY

FIELD OF THE INVENTION

The present invention relates to a transmission having a fan assembly.

BACKGROUND INFORMATION

In certain conventional systems, a fan assembly can be used for cooling a device.

German Patent Document No. 10 2008 010 912 describes a fan wheel and a fan hood having a fan guard integrated on the fan hood as a single part.

A drive is described in German Patent Document No. 10 2005 031 197.

A power transmission device is described in German Patent Document No. 11 2014 000 834.

A cooling assembly for a transmission is described in German Patent Document No. 10 2008 017 755.

A fan wheel is described in German Patent Document No. 10 2007 009 366.

An air-cooled transmission unit is described in U.K. Patent Document No. 436 416.

An air cooling system for an enclosed transmission is described in U.S. Pat. No. 4,872,502.

A drive having a fan is described in German Patent Document No. 10 2005 031 197.

A power transmission device is described in U.S. Patent Application Publication No. 2014/0338495.

A transmission having a fluid cooler is described in U.S. Patent Application Publication No. 2011/0179903.

A system for attaching an inner air baffle on an air deflecting cap for electric machines is described in German Patent Document No. 11 2013 007 680.

SUMMARY

Example embodiments of the present invention provide a transmission having a fan assembly, in which simple and inexpensive production is able to be achieved.

According to an example embodiment of the present invention, in a transmission having a fan assembly, the fan assembly includes a fan wheel, a hood, and a guard. The fan wheel is connected to the driving shaft of the transmission for conjoint rotation, and the fan hood is attached to a, e.g., multi-piece retaining frame fastened to the housing of the transmission. The hood is formed of two hood parts, and a cover part is adjacent to a first hood part and is supported and/or retained by at least one tab connected to the housing of the transmission and/or attached to the housing. For example, the region covered by the cover part in the axial direction is spaced apart from the region covered by the first hood part in the axial direction or is adjacent to the same, and the axial direction is the direction of the axis of rotation of the driving shaft. For example, the fan hood and the cover part are disposed and formed such that a portion of the air stream transported by the fan is guided between the housing of the transmission and the cover part by the hood and the cover part. For example, a circumferential angle range covered by the first guard part in the circumferential direction is adjacent to, but, e.g., not overlapping, the circumferential angle range covered by the second guard part in the circumferential direction, and a circumferential angle range covered by the first hood part in the circumferential direction is adjacent to, but, e.g., not overlapping, the circumferential angle range covered by the second hood part in the circumferential direction. For example, a circumferential angle range covered by the first guard part in the circumferential direction overlaps the circumferential angle range covered by the first hood part.

Thus, the hood parts of the fan hood are retained by the retaining frame, but the cover part is arranged as an axial extension of the fan hood and need not be supported by the retaining frame, but rather is attached to and supported by the housing of the transmission. The cover part may be optionally connected to one of the hood parts in order to achieve the highest possible tightness between the cover part and the fan hood and to keep the losses of the transported air stream low. The connection is not load-bearing, however, as otherwise the retaining frame would have to apply excessive support loads and the support force for the cover part would have to be transmitted through the hood part. For example, the hood part can be produced using very little mass and material, and is therefore supported by the retaining frame with no special effort. The cover part can be attached to and supported by the housing of the transmission by tabs. The part is thus not self-supporting in configuration. For example, threaded holes must be introduced into the housing for attaching the cover part. However, that the cover part can be made of thin sheet metal or plastic. Because even the hood parts and the cover part can be produced as stamped, bent parts made of sheet steel, an inexpensive configuration is made possible. Attaching the cover part to the housing and separating the cover part from the hood part also brings about reduced tendency to vibrate and thus higher strength.

The cover part guides along the transmission housing a portion of the air stream transported by the fan. Improved cooling of the transmission is thus achievable. To this end, the cover part is formed such that the cover part retained by tabs attached to the transmission housing guides the portion of the air stream between the transmission housing and the cover part.

According to example embodiments, the guard is formed of two guard parts, and each guard part is connected to each of the two hood parts, e.g., by screws, e.g., the first guard part is connected to both the first and the second hood part and the second guard part is connected to both the first and the second hood part. Thus, the stability of the fan hood is increased by the guard parts acting as connectors. Resonance vibrations of the fan hood are thus also suppressed. The complex assembly, however, is considered disadvantageous.

According to example embodiments, a surface region of the housing of the transmission connected to the tab is flat in configuration and thus is encompassed by a first plane. A connecting region of the cover part contacting the tab or adjacent to the tab is flat in configuration and thus is encompassed by a second plane. The first plane is at a non-negligible angle to the second plane, e.g., the normal direction of the first plane relative to the normal direction of the second plane, thus are particularly not aligned parallel to each other. Thus, the tab can be implemented as an angle part, so that it is possible to connect the cover part to the housing although the cover part is not aligned parallel to the surface region of the housing. The tab thus bridges and connects the cover part to the housing, and a screw is threaded into a threaded hole of the housing for pressing the tab against the housing and the head of the screw presses the tab against the housing. The tendency to vibrate is thereby reduced.

According to example embodiments, the tab is produced as a stamped, bent part. For example, the tab is connected to the cover part by a screw, the screw head thereof pressing the cover part and the tab against a nut into which the screw is threaded into a nut. Thus, the tab can be produced as a separate sheet metal part, so that the screw can be inserted through an elongated hole of the tab and thus tolerances can be compensated for. The tendency to vibrate is thereby reduced.

According to example embodiments, the tab is integral to the cover part, e.g., as a single part, e.g., as an integral bending region on the cover part, e.g., as a single part. Thus, the tendency to vibrate and the number of parts can be further reduced. Producing the cover part, however, requires lower tolerances and/or higher quality.

According to example embodiments, the tab is pressed against the housing by a screw head of a screw threaded into a threaded hole of the housing. Thus, a simple, inexpensive, load-bearing attaching of the cover part is made possible.

According to example embodiments, the cover part is connected to the first hood part. Thus, only a small portion of the air stream is lost and the tendency to vibrate can be reduced.

According to example embodiments, the region covered by the cover part in the axial direction is spaced apart from the region covered by the first hood part in the axial direction or is adjacent to the same. Thus, a tendency to vibrate is reduced because the cover part and the first hood part are vibrationally decoupled. The overall tendency to vibrate is thus reduced.

According to example embodiments, the guard is formed of two guard parts, the first parting line thereof is a straight segment or is formed of two straight segments in alignment with each other, the hood is formed from two hood parts, and the second parting line is a flat curve including straight line segments.

Thus, simple production is made possible because the guard parts are much smaller than a guard implemented as a single part. The hood parts can also be produced from a metal sheet by stamping and bending.

The non-parallel alignment of the two parting lines to each other can achieve increased stability, e.g., against mechanical vibrations.

According to example embodiments, the guard parts are formed as polygons on the outer circumference of each, such that the contact surface between the guard part and the associated hood part includes flat surface pieces in each case. Thus, a stable connection of the guard parts to the hood parts can be produced by screws, and resonant vibrations can be suppressed.

According to example embodiments, the first parting line and the axis of rotation of the driving shaft define a first plane, the second parting line and the axis of rotation of the driving shaft define a second plane, and the second plane is oriented perpendicular to the first plane, or at least includes an angle between 30° and 90°. Thus, increased stability can be achieved and vibrations can be suppressed.

According to example embodiments, the hood formed of the two hood parts is formed such that the hood includes an axially penetrating cutout, e.g., disposed centered relative to the driving shaft. Thus, the hood parts each have only low mass and the two guard parts can be used as fan hood guards. Both the hood parts and the guard parts can thus each be produced as stamped, bent parts, and efficient utilization of the sheet metal can be achieved when stamping.

According to example embodiments, a tab region protruding into the cutout is implemented on each of the hood parts produced from sheet metal as stamped, bent parts, to which the first or the second guard part is attached, e.g., by screws. Thus, simple, secure attaching can be achieved for the guard parts.

According to example embodiments, a tab region protruding into the cutout is implemented on the hood parts produced from sheet metal as stamped, bent parts, to which the first or the second guard part is attached, e.g., by screws, and, for example, nuts are welded onto the corresponding tab region for providing threaded holes for the screws. Thus, the hood part can be provided easily and inexpensively and the guard parts need only be screwed on.

According to example embodiments, a frame part welded onto the inner side of the corresponding hood part protrudes into the cutout on each of the hood parts produced from sheet metal as stamped, bent parts, to which the first or the second guard part is attached, e.g., by screws, and, for example, nuts are welded onto the frame part for providing threaded holes for the screws. Thus, the hood parts are reinforced by the strut-like frame part and are thus resistant to impact.

According to example embodiments, the cutout is, e.g., fully covered by the guard, e.g., by the two guard parts, e.g., so that the axially inflowing air stream passes through the guard. Thus, the guard openings of the guard are so small that protection against a human hand reaching through is provided.

According to example embodiments, the two guard parts make contact along the first parting line or have a distance from each other of less than 5 mm.

According to example embodiments, the two hood parts make contact along the second parting line or have a distance from each other of less than 5 mm. Thus, either contact or, alternatively, only a very slight distance is present along the parting lines and prevents a human hand from reaching through.

According to example embodiments, the air stream transported by the fan wheel exits between the housing of the transmission and the hood, e.g., aligned such that the stream flows along the housing of the transmission. Thus, the transmission is cooled as effectively and uniformly as possible.

According to example embodiments, the hood includes an end face shaped as an irregular polygon in the circumferential direction, e.g., in that the radially outer circumference of the end face of the hood is shaped as an irregular polygon. Thus, a circular fan is used for a cuboid transmission, but nevertheless the air stream flows as uniformly distributed as possible along the transmission.

According to example embodiments, the hood parts and/or the guard parts are each produced as stamped, bent parts. Thus, simple production is made possible.

According to example embodiments, a hand guard is attached to each hood part, e.g., on the inner wall of each hood part, and is disposed between the hood part and the housing of the transmission. The hand guard includes penetrating guard openings, and, for example, is permeated by the airflow transported by the fan wheel. Thus, reaching in against the flow direction of the air stream transported by the fan wheel can also be prevented. The hand guard is also mounted on the inner wall of the hood part. A direct connection to the transmission is thus not necessary.

According to example embodiments, each hood part includes radially penetrating cutouts formed as a slit, elongated hole, or ellipse, and the longest extent of each particular cutout is aligned in the axial direction.

Thus, air can flow in radially, e.g., when axial inflowing is hindered or prevented by objects or devices disposed close to the guard parts. Contact protection against making contact with rotating parts thus also results.

According to example embodiments, each guard part includes a uniform and/or regular, flat grid of, e.g., hexagonal cutouts, e.g., grid openings, axially penetrating through the particular guard part. Thus, as great an air stream as possible can flow in with as little air resistance as possible. The flow resistance generated by each guard part is thereby also low. Nevertheless, contact protection against contact with rotating parts is achieved.

Further features and aspects of example embodiments of the present invention are explained in greater detail below with reference to the appended schematic Figures.

DETAILED DESCRIPTION

Figure 1:
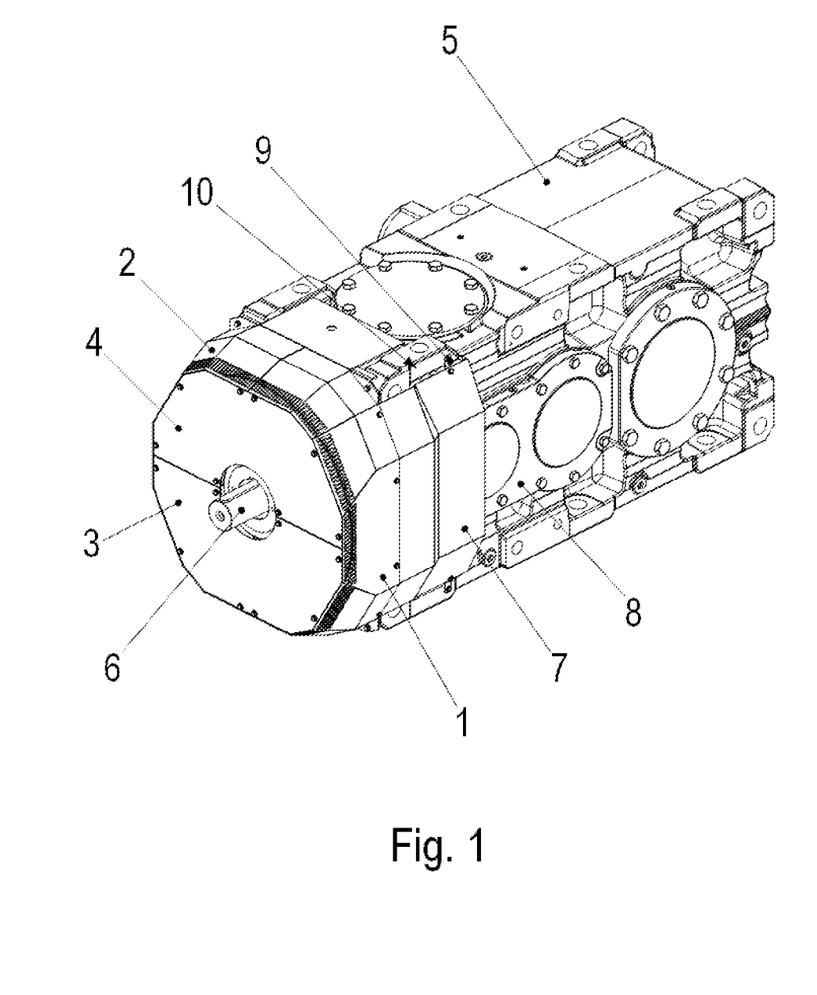
FIG. 1 is a perspective view of a transmission.

A transmission according to an example embodiment of the present invention having a fan disposed on the input side is illustrated in a perspective view in FIG. 1.

Figure 2:
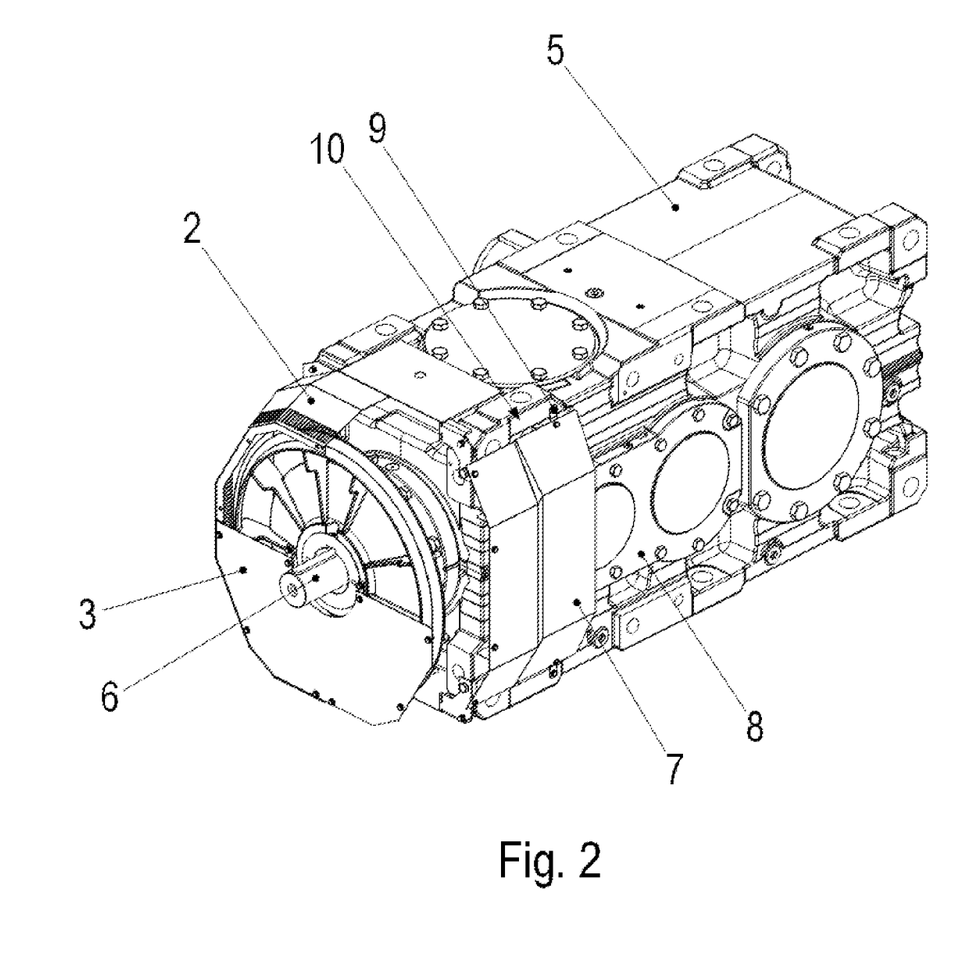
FIG. 2 is a perspective view of a transmission.

In contrast to FIG. 1, a first hood part 1 and a second guard part 4 are not illustrated in FIG. 2.

Figure 3:
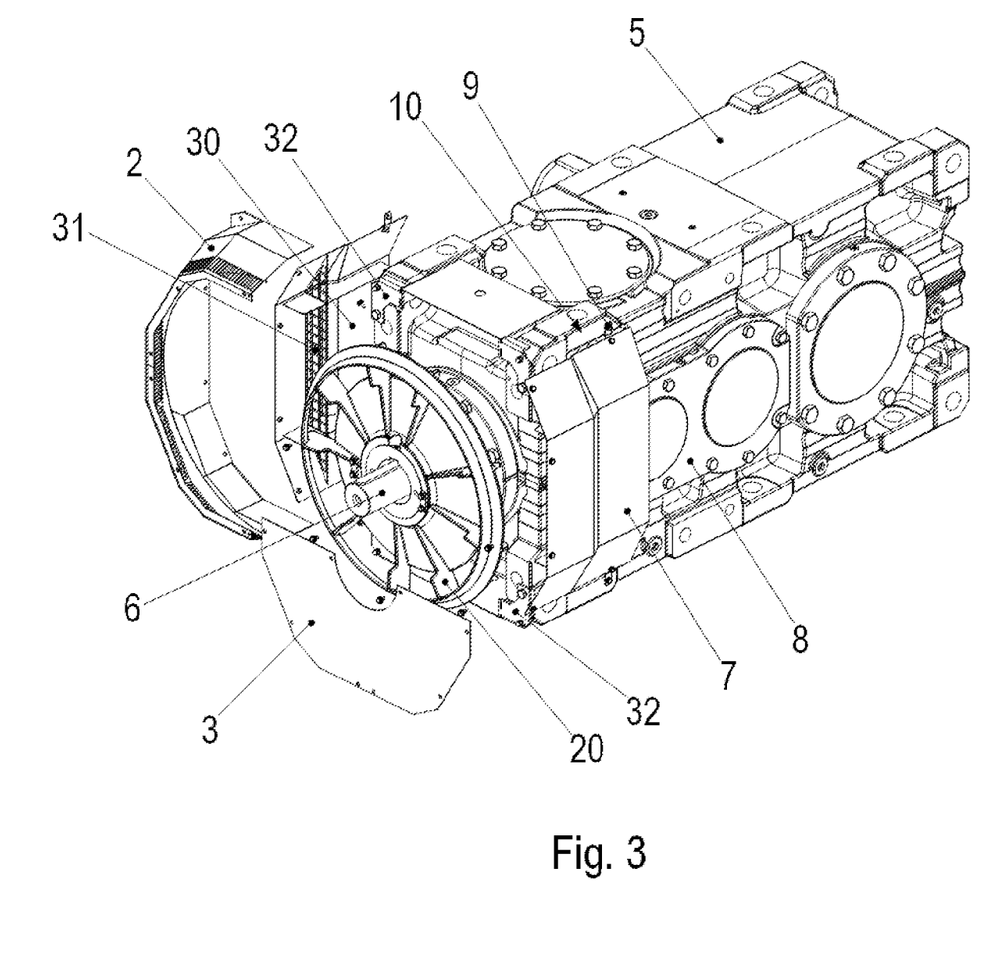
FIG. 3 is an exploded perspective view of a transmission.

In contrast to FIG. 2, the components of the fan disposed outside of the housing 5 of the transmission are illustrated in an exploded view in FIG. 3, in which a mounting frame having two parts is illustrated.

Figure 4:
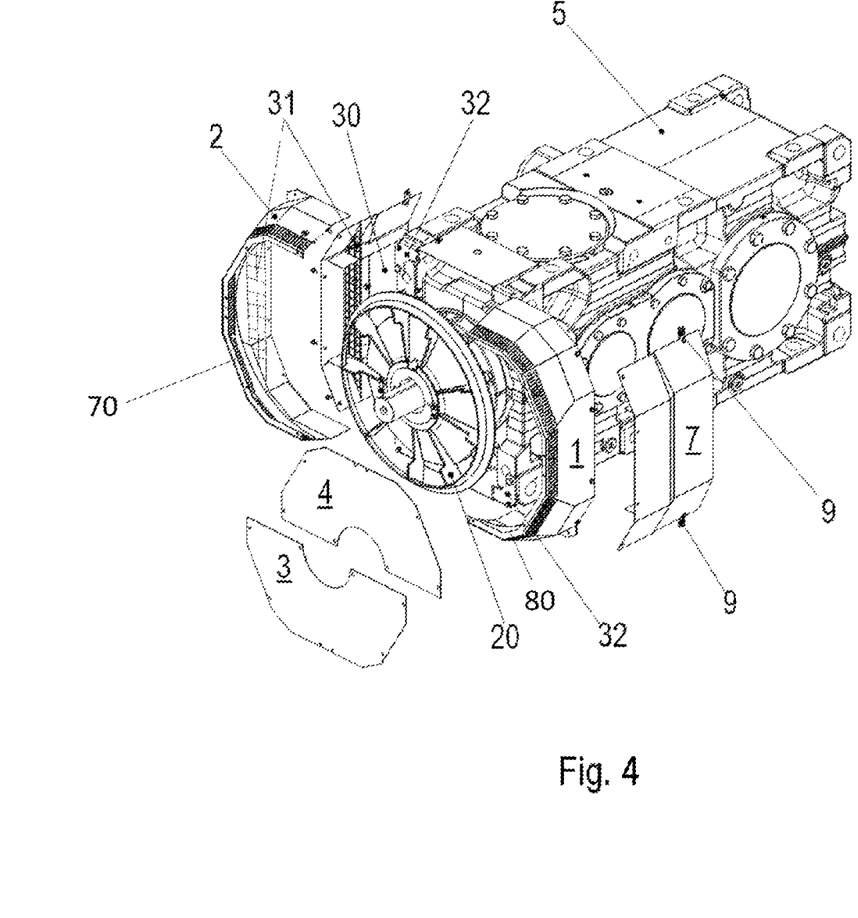
FIG. 4 is an exploded perspective view of a transmission.

In contrast to FIG. 1, the components of the fan disposed outside of the housing 5 of the transmission are illustrated in an exploded view in FIG. 4.

Figure 5:
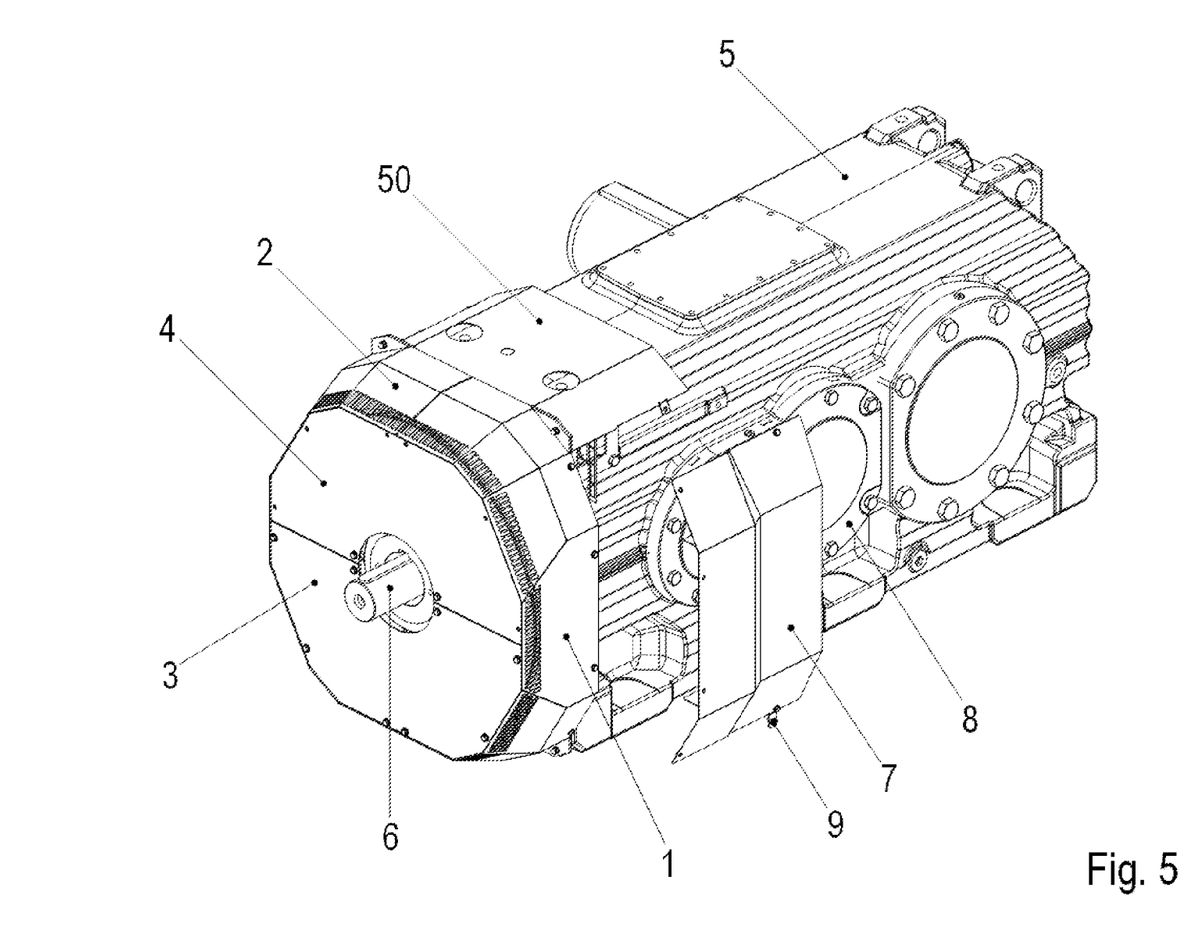
FIG. 5 is an exploded perspective view of a transmission.

A transmission is illustrated in a perspective view in FIG. 5.

Figure 6:
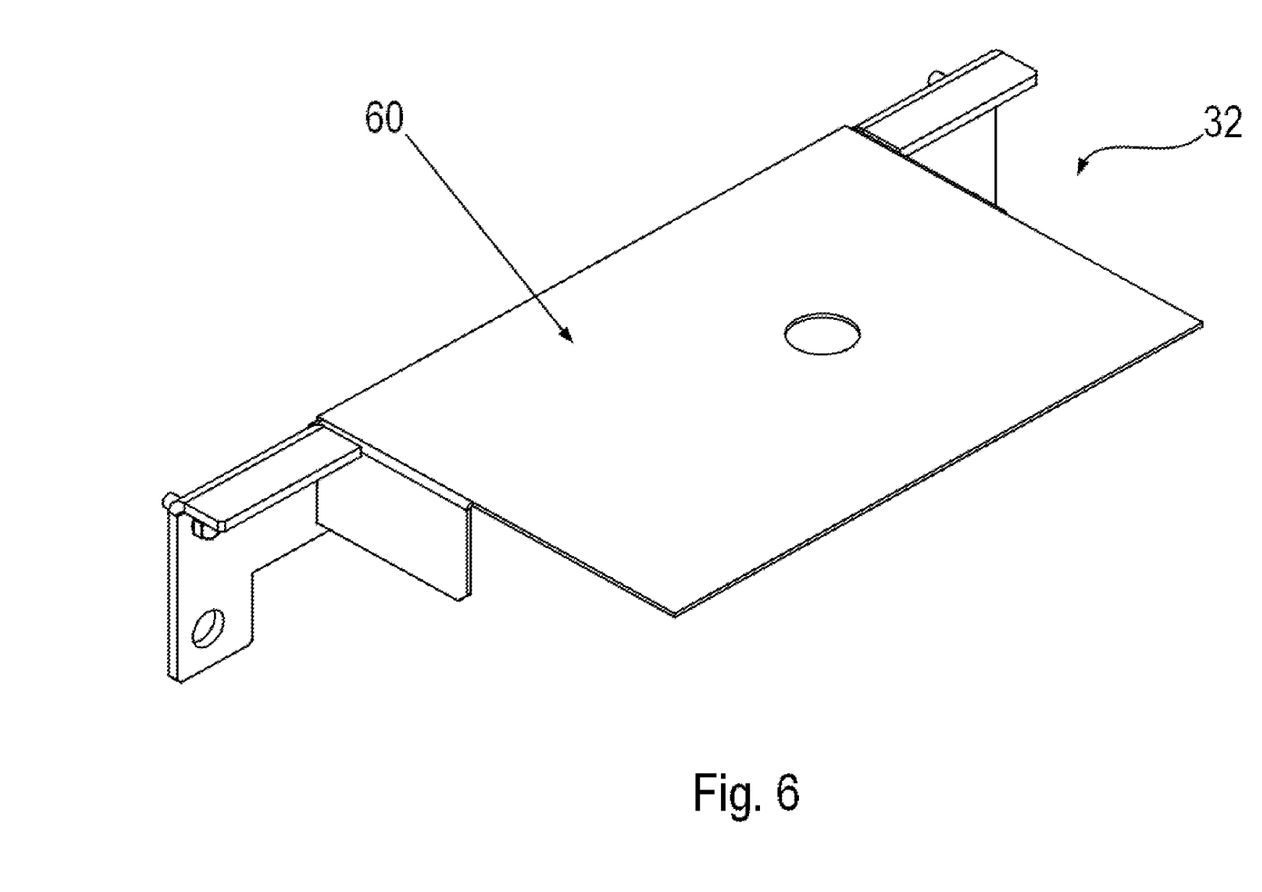
FIG. 6 is a perspective view of one of two pieces of a mounting frame.

One of the two pieces of the mounting frame 32 is illustrated in a perspective view in FIG. 6.

As illustrated, the transmission has an input shaft 6 rotatably supported by bearings in a housing 5 of the transmission.

A fan wheel 20 is connected to the driving shaft 6 of the transmission for conjoint rotation and is enclosed by a hood assembly attached to a retaining frame 32 on the housing 5 of the transmission. The retaining frame 32 is implemented in a plurality of parts, e.g., two parts, and is attached to the housing 5 by fastening screws.

The hood assembly includes a first hood part 1 and a second hood part 2 both screwed on the retaining frame 32 by screws.

Each of the two hood parts 1, 2 covers a circumferential angle of 180° relative to the axis of rotation of the driving shaft 6. The parting line between the two hood parts 1, 2 extends vertically, for example.

The two hood parts 1, 2 thus form a fan hood for guiding the air stream transported by the fan wheel 20, so that the stream flows out of the fan hood 20 along the housing 5. The housing 5 of the transmission is roughly cuboid in shape. Because the fan wheel 20 is round, however, the fan hood formed by the two hood parts 1, 2 contacting each other or at least disposed very close to each other has a polygonal circumference. The air stream flowing out between the fan hood and housing 5 is thus as independent as possible of the circumferential angle. In other words, the air stream exiting the fan hood is distributed as uniformly as possible about the circumferential direction. An optimal cooling effect can thereby be achieved. The round fan wheel 20, for example, does not protrude past the corners of the cuboid, but rather only at the straight lateral surfaces. The fan hood does also protrude past the corners and thus guides an exiting air stream out to the corner regions of the cuboid as well.

Each hood part 1, 2 is implemented as a stamped, bent part, e.g., such that the circumference thereof includes a region having cutouts and is thus air-permeable, allowing an air stream coming from the radial direction to enter the fan hood.

The radial direction relates to the axis of rotation of the driving shaft.

The hood formed of the two hood parts 1, 2 is formed such that the hood includes an axially penetrating cutout, disposed at the center. Tab regions 80 protruding into the cutout are also formed on the hood parts 1, 2 made of sheet metal as stamped, bent parts, on which a first or a second guard part 3, 4 is attached, e.g., attached by screws.

The cutout is thus completely covered by the guard parts 3 and 4. The axially inflowing air stream passes through the fan guard.

For providing a threaded hole for screws connecting the guard parts 3, 4 to the tab regions of the hood parts 1, 2, nuts are welded on the tab regions. The guard parts 3, 4 can thus be screwed on by the screws passing axially through a cutout of the corresponding tab region and threaded into the nuts, the screw heads thereof pressing against the corresponding tab region.

The two guard parts 3 and 4 contact each other along a straight line or are spaced apart by less than 5 mm along a straight line. The line is also referred to as the first parting line.

The first parting line and the axis of rotation of the driving shaft define a first plane.

The first hood part 1 contacts the second hood part 2 along a flat curve or is spaced apart by less than 5 mm along a flat curve. The flat curve is also referred to as the second parting line.

The second parting line is made of straight line segments.

The second parting line and the axis of rotation of the driving shaft define a second plane.

The second plane is not parallel to the first plane, but rather, for example, is aligned perpendicular thereto or at an angle at least between 30° and 90°.

Increased stability is thus achieved, because the hood parts 1, 2 and the guard parts 3, 4 are produced as stamped, bent sheet metal parts. The angle thus reduces or prevents the risk of a resonance vibration.

The guard parts 3, 4 each include a, e.g., regular mesh of penetrating cutouts. An air stream can thereby pass through axially and be drawn to the fan.

A hand guard 31 is disposed at the inner side of the first hood part 1, through which the air stream transported by the fan exits and flows out guided by the first hood part 1 such that the stream flows along the outer side of the transmission.

The first hood part 1 further includes a semicircular cutout, so that a bearing cover segment of a bearing cover covering the driving shaft protruding axially toward the cutout has a sufficiently large distance from the hood part 1, so that the air drawn in by the fan enters as uniformly as possible at the circumference through the cutout and thus also exits as uniformly as possible at the circumference of the fan hood, and the housing 5 is thus uniformly cooled.

A hand guard 31 is mounted on the cover part 30. Alternatively, a hand guard 31 can be attached at the inner side of the second hood part 2, as indicating in phantom in FIG. 4, through which the air stream transported by the fan exits and flows out guided by the second hood part 2 such that the stream flows along the outer side of the transmission.

As illustrated, the second hood part 2 further includes a semicircular cutout, so that a bearing cover segment of a bearing cover covering the driving shaft protruding axially toward the cutout has a sufficiently large distance from the second hood part 2, so that the air drawn in by the fan enters as uniformly as possible at the circumference through the cutout and thus also exits as uniformly as possible at the circumference of the fan hood, and the housing 5 is thus uniformly cooled.

The fan hood can also be affixed to a different transmission, in which the round bearing cover segment is not present or is disposed at a further distance. In this instance, the cutout on the first hood part 1 is closed off by mounting a cover part 30 and thus the air stream is guided better and more uniformly along the housing 5. Also in this instance, the cutout on the second hood part 2 is closed off by mounting a cover part 30 and thus the air stream is guided better and more uniformly along the housing 5.

When a coupling or an electric motor is connected to the driving shaft and is disposed axially near the fan hood, such that that no air can flow axially, that is, through the guard parts 3 and 4, it is nevertheless possible for air to flow to the fan radially through the hood parts 1 and 2.

Inflow of the air stream drawn in by the fan wheel is thus made possible from the radial and axial direction by the cutouts of the corresponding air-permeable region of the hood part 1, 2 and by the guard parts 3, 4.

The end face of the fan hood formed as an irregular polygon not only provides for uniformly distributing the air stream in the circumferential direction, but also provides for simple production of the two-part fan hood as stamped, bent parts. The bottom side of the transmission acts as a base surface or stand surface and is not permeated by the air stream.

The polygonal shape of the fan hood also, however, provides for flat tab regions to be formed, disposed on each hood part and bent away from the same, providing for simple attaching of the also polygonal guard parts 3, 4.

The cutouts of the air-permeable region on the guard parts 3 and 4 are also implemented as a hexagon and spaced uniformly apart from each other. The air-permeable region thus includes a flat, regular mesh of cutouts implemented as hexagons and penetrating axially through each guard part 3, 4. Optimized utilization of the mesh surface is thus made possible, e.g., retaining high stability despite as much air permeability as possible.

The hood parts 1 and 2, in contrast, include cutouts formed as a slit, elongated hole, or ellipse and penetrating radially, the greatest extent thereof being aligned in the axial direction. Because the cutouts are disposed in the end region of the hood parts 1, 2 adjacent to or facing toward each of the guard parts 3, 4, the elongated shape brings about as low a flow resistance as possible for radially inflowing air and sufficient stability for receiving and for supporting the guard parts 3, 4 by the hood parts 1, 2.

The hood parts 1 and 2 are expanded as little as possible for increasing stability. In order to allow the air stream to flow as efficiently as possible in the axial direction on the housing of the transmission, however, a cover part 7 is adjacent to the hood part 1 for guiding the air stream. The cover part 7 extends along the housing and is also attached to the housing by tabs 9.

The cover part 7, like the hood part 1, is produced as a stamped, bent part, e.g., as a sheet metal part. Tabs 9 also produced as stamped, bent parts, serve for attaching the cover part 7 to the housing. The, the connecting region of the cover part 7, e.g., such region of the cover part 7 to which the tabs 9 are connected and/or make contact, is flat in configuration. The connecting region of the cover part 7 is thus disposed in a plane not parallel to, e.g., not at a negligible angle to, a flat surface region of the housing of the transmission. The connecting region thus does not contact the surface region of the housing of the transmission in a flat manner, but only linearly, when the two parts contact each other. The tabs 9 therefore bridge the non-negligible angle present between the surface region and the connecting region.

The retaining frame 32 is implemented in two pieces, in which each of the pieces is implemented as a stamped, bent part. The retaining frame 32 is attached to the housing 5 on one side, e.g., by screws threaded into threaded holes, the screw heads thereof pressing the corresponding piece against the housing 5. On the other side, both hood parts 1, 2 are connected to each of the pieces. The hood parts 1, 2 are thus supported, e.g., retained, by the retaining frame 32 attached to the housing 5.

Each piece of the retaining frame 32 also includes an air guiding region protruding in the axial direction and thus guiding the air stream transported by the fan at least partially between the piece and the housing 5. A portion of the air stream thus flows through between the air guiding region of the piece and the housing 5. The retaining frame 32 is attached to the housing 5 and the air guiding region is thus retained in a self-supporting manner.

The cover part 7, in contrast, is attached to the housing 5 by the tabs 9.

A sheet metal part 50 is attached to the hood parts 1, 2, so that the transported air stream can be guided along the housing 5 in a directed manner.

For example, the tabs 9 are formed on the cover part 7 itself, in that the tabs are implemented as a bent region of the cover part 7. The tabs 9 thus need not be connected to the cover part 7, as the tabs are integrally formed, e.g., as a single part, on the cover part 7 itself and are bent such that the tabs contact the surface region of the housing of the transmission in a flat manner. Each tab 9 is pressed against the housing of the transmission by a screw head of a screw threaded into a threaded hole of the housing. A simple and inexpensive connection is thus achieved, although the region of the cover part 7 adjacent to the tab 9 is not aligned parallel to the surface region of the housing receiving the threaded hole.

The surface region is illustrated as a flat surface piece 10.

For the elliptical arrangement, the major axis of each ellipse is aligned in the axial direction.

For example, the fan hood is implemented as a plurality of parts rather than two parts.

For example, no tab regions are formed at the inner side of the hood parts 1, 2, but rather a polygonally shaped frame part 70 is welded to each of the hood parts 1, 2. The perpendicular projection of the frame part in the axial direction is similar to a partial region of a polygon. The originally flat frame part is bent at each corner of the partial region of the polygon, so that each side of the frame part disposed between two adjacent corners of the polygon is flat and is aligned perpendicular to the hood part. The normal direction of the plane receiving the polygon is aligned in the axial direction. The corresponding hood part 1, 2 is thereby stabilized. For providing a threaded hole for screws connecting the guard parts 3, 4 to the hood parts 1, 2, nuts are welded on the frame parts. The guard parts 3, 4 can thus be screwed on by the screws passing axially through a cutout of the corresponding frame part and threaded into the nuts, the screw heads thereof pressing against the corresponding frame part.

LIST OF REFERENCE NUMERALS

1 First hood part
2 Second hood part
3 First guard part
4 Second guard part
5 Housing
6 Driving shaft
7 Cover part
8 Bearing cover
9 Tab
10 Flat surface piece
20 Fan wheel
30 Cover part
31 Hand guard
32 Retaining frame
50 Sheet metal part
60 Air guiding region of a part of the retaining frame 32
70 Frame
80 Tab region

The invention claimed is:

1. A transmission, comprising:
a fan assembly including a fan wheel connected to a driving shaft of the transmission for conjoint rotation, a hood attached to a retaining frame fastened to a housing of the transmission and formed of a first hood part and a second hood part, and a guard; and
a cover part adjacent to the first hood part and supported and/or retained by at least one tab connected to the housing of the transmission and/or attached to the housing of the transmission;
wherein a region covered by the cover part in an axial direction is spaced apart from a region covered by the first hood part in the axial direction or is adjacent thereto;
wherein the axial direction is a direction of an axis of rotation of the driving shaft;
wherein the hood and the cover part are arranged such that a portion of an air stream transported by the fan wheel is guided between the housing of the transmission and the cover part by the hood and the cover part;
wherein a circumferential angle range covered by a first guard part in a circumferential direction is adjacent to, but not overlapping, a circumferential angle range covered by a second guard part in the circumferential direction;
wherein a circumferential angle range covered by the first hood part in the circumferential direction is adjacent to, but not overlapping, a circumferential angle range covered by the second hood part in the circumferential direction;
wherein a circumferential angle range covered by the first guard part in the circumferential direction overlaps the circumferential angle range covered by the first hood part;
wherein the guard includes the first guard part and the second guard part, each of the first guard part and the second guard part connected to each of the two hood parts.

2. The transmission according to claim 1, wherein the hood is arranged as a fan hood, and the retaining frame is arranged as a multi-piece retaining frame.

3. The transmission according to claim 1, wherein each of the first guard part and the second guard part is screw-connected to each of the two hood parts, the first guard part is connected to both the first hood part and the second hood part, and the second guard part is connected to both the first hood part and the second hood part.

4. The transmission according to claim 1, wherein a surface region of the housing of the transmission connected to the tab is flat and is encompassed by a first plane, a connecting region of the cover part contacting the tab or adjacent to the tab is flat and is encompassed by a second plane, and the first plane and the second plane are not aligned parallel to each other.

5. The transmission according to claim 1, wherein the tab is arranged as a stamped, bent part.

6. The transmission according to claim 5, wherein the tab is connected to the cover part by a screw including a screw head that presses the cover part and the tab against a nut into which the screw is threaded.

7. The transmission according to claim 5, wherein the tab is integral to the cover part and/or the tab is arranged as an integral bent region on the cover part.

8. The transmission according to claim 1, wherein a screw head of a screw threaded into a threaded hole of the housing presses the tab against the housing.

9. The transmission according to claim 1, wherein the cover part is connected to the first hood part.

10. The transmission according to claim 1, wherein each guard part is arranged as a polygon, a contact surface between each guard part and a corresponding hood part including flat surface pieces.

11. The transmission according to claim 1, wherein a first parting line between the guard parts is arranged as a straight line or as two straight lines aligned with each other, a second parting line between the first hood part and the second hood part is arranged as a flat curve including straight line segments, the first parting line and an axis of rotation of the driving shaft defining a first plane, the second parting line and the axis of rotation of the driving shaft defining a second plane, the second plane is oriented perpendicular or at an angle between 30° and 90° to the first plane.

12. The transmission according to claim 1, wherein the hood includes an axially penetrating cutout.

13. The transmission according to claim 12, wherein the cutout is arranged centered relative to the driving shaft.

14. The transmission according to claim 12, wherein a tab region protruding into the cutout is arranged on each of the hood parts produced from sheet metal as stamped, bent parts, to which the first guard part or the second guard part is attached.

15. The transmission according to claim 14, wherein the first guard part or the second guard part is connected to the tab region by screws, each tab region including a welded nut including threaded holes for the screws.

16. The transmission according to claim 12, wherein a frame part welded onto an inner side of the corresponding hood part protrudes into the cutout on each of the hood parts produced from sheet metal as stamped, bent parts, to which the first guard part or the second guard part is attached.

17. The transmission according to claim 16, wherein the first guard part or the second guard part is connected to the frame part by screws, the frame part including welded nuts including threaded holes for the screws.

18. The transmission according to claim 12, wherein the cutout is fully covered by the guard, and/or by the first guard part and the second guard part.

19. The transmission according to claim 18, wherein an axially inflowing air stream passes through the guard.

20. The transmission according to claim 1, wherein the first guard part and the second guard part make contact along a first parting line or have a distance from each other of less than 5 mm.

21. The transmission according to claim 1, wherein the first guard part and the second guard part make contact along a second parting line or have a distance from each other of less than 5 mm.

22. The transmission according to claim 1, wherein an air stream transported by the fan wheel exits between the housing of the transmission and/or flows along the housing of the transmission.

23. The transmission according to claim 1, wherein the hood includes an end face shaped as an irregular polygon in a circumferential direction and/or a radially outer circumference of the end face of the hood is shaped as an irregular polygon.

24. The transmission according to claim 1, wherein the first hood part, the second hood part, the first guard part, and/or the second guard part is arranged as a stamped, bent part.

25. The transmission according to claim 1, wherein a hand guard is attached to each hood part and/or on the inner wall of each hood part, and is disposed between the hood part and the housing of the transmission, the hand guard including penetrating guard openings permeated by an airflow transported by the fan wheel.

26. The transmission according to claim 1, wherein each hood part includes radially penetrating cutouts formed as a slit, elongated hole, or ellipse, a longest extent of each cutout being aligned in an axial direction.

27. The transmission according to claim 1, wherein each guard part includes a uniform and/or regular, flat grid of hexagonal cutouts and/or grid openings, axially penetrating through the guard part.

28. A transmission, comprising:
a fan assembly including a fan wheel connected to a driving shaft of the transmission for conjoint rotation, a hood attached to a retaining frame fastened to a housing of the transmission and formed of a first hood part and a second hood part, and a guard; and a cover part adjacent to the first hood part and supported and/or retained by at least one tab connected to the housing of the transmission and/or attached to the housing of the transmission;

wherein a region covered by the cover part in an axial direction is spaced apart from a region covered by the first hood part in the axial direction or is adjacent thereto;

wherein the axial direction is a direction of an axis of rotation of the driving shaft;

wherein the hood and the cover part are arranged such that a portion of an air stream transported by the fan wheel is guided between the housing of the transmission and the cover part by the hood and the cover part;

wherein a circumferential angle range covered by a first guard part in a circumferential direction is adjacent to, but not overlapping, a circumferential angle range covered by a second guard part in the circumferential direction;

wherein a circumferential angle range covered by the first hood part in the circumferential direction is adjacent to, but not overlapping, a circumferential angle range covered by the second hood part in the circumferential direction;

wherein a circumferential angle range covered by the first guard part in the circumferential direction overlaps the circumferential angle range covered by the first hood part; and wherein a first parting line between the guard parts is arranged as a straight line or as two straight lines aligned with each other, a second parting line between the first hood part and the second hood part is arranged as a flat curve including straight line segments, the first parting line and an axis of rotation of the driving shaft defining a first plane, the second parting line and the axis of rotation of the driving shaft defining a second plane, the second plane is oriented perpendicular or at an angle between 30° and 90° to the first plane.

* * * * *